(12) United States Patent
Tadic et al.

(10) Patent No.: US 10,592,674 B2
(45) Date of Patent: Mar. 17, 2020

(54) DIGITAL OBSOLESCENCE AVOIDANCE SYSTEMS AND METHODS

(71) Applicant: Digital Bedrock, Los Angeles, CA (US)

(72) Inventors: Linda Tadic, Venice, CA (US); David Margolis, Providence, RI (US); Diana Eppstein, Irvine, CA (US)

( * ) Notice: Subject to any disclaimer, the term of this patent is extended or adjusted under 35 U.S.C. 154(b) by 270 days.

(21) Appl. No.: 15/650,668

(22) Filed: Jul. 14, 2017

(65) Prior Publication Data
US 2018/0018464 A1    Jan. 18, 2018

Related U.S. Application Data

(60) Provisional application No. 62/362,512, filed on Jul. 14, 2016.

(51) Int. Cl.
*G06F 21/57* (2013.01)

(52) U.S. Cl.
CPC ...... *G06F 21/577* (2013.01); *G06F 2221/033* (2013.01); *G06F 2221/034* (2013.01)

(58) Field of Classification Search
None
See application file for complete search history.

(56) References Cited

U.S. PATENT DOCUMENTS

2005/0187744 A1* 8/2005 Morrison ............... G06Q 10/06
703/2
2010/0241615 A1* 9/2010 Marshall ............... G06F 16/116
707/661

OTHER PUBLICATIONS

David Pearson, Colin Webb, "Defining File Format Obsolescence: A Risky Journey", Jul. 2008, The International Journal of Digital Curation, Issue 1, vol. 3, pp. 89-106. (Year: 2008).*
Roman Graf et al., A decision support system to facilitate file format selection for digital preservation, Libellarium, IX, 2, 2016; 267-274.
Roman Graf et al., A Risk Analysis of File Formats for Preservation Planning.
SCAPE—Scalable Preservation Environments website, available at http://scape-project.eu/.
File Format Metadata Aggregator—FFMA (open source software available online), available at https://github.com/ait-ngcms/ffma.
Austrian Institute of Technology, File Format Metadata Aggregator website, available at https://www.ait.ac.at/en/research-fields/data-science/prototypes-demos/file-format-metadata-aggregator/.

* cited by examiner

*Primary Examiner* — Joseph P Hirl
*Assistant Examiner* — Hassan Saadoun
(74) *Attorney, Agent, or Firm* — Alexander Legal LLC

(57) ABSTRACT

Digital obsolescence avoidance systems and methods may determine an obsolescence vulnerability for a digital object. A digital obsolescence avoidance system may include a validation system and an obsolescence vulnerabilities system. The validation system may be configured to receive metadata for the digital object and to determine a digital object kind for the received metadata. The obsolescence vulnerabilities system may be configured to determine one or more dependencies for the determined object kind, to determine an obsolescence vulnerability based on the determined one or more dependencies, and to provide output related to the determined obsolescence vulnerability.

12 Claims, 5 Drawing Sheets

ID
DIGITAL OBSOLESCENCE AVOIDANCE SYSTEMS AND METHODS

CROSS-REFERENCE TO RELATED APPLICATION

This application claims priority benefit of U.S. Provisional Application 62/362,512 filed on Jul. 14, 2016, the disclosure of which is incorporated herein by reference in its entirety.

BACKGROUND

1. Field

Embodiments of the present invention relate generally to preserving computer data, and particularly to digital obsolescence avoidance systems and methods.

2. Description of the Related Art

Until recently, much of the commercial focus on preserving computer data has focused on developing durable storage media, such as hard drives, data tape storage, solid state drives, and optical media. However, data preservation by itself does not necessarily guard against digital obsolescence.

Digital obsolescence may occur, for example, when a digital object can no longer be rendered because of its archaic format. A "digital object" can range from simple (e.g., a single file/format) to complex (multiple files bundled together with all required to render the digital object). A non-limiting example of a single file/format digital object is a JPEG image. A non-limiting example of a more complex digital object is a Digital Cinema Package (DCP) including individual video, audio, and xml data files within the package. In the case of a DCP, the DCP itself can become obsolete, as can the individual files within it. Just one of many sample digital objects is an MOV container/format with a ProRes codec (video). This example could appear to be a single file/format, but it is actually both a proprietary format (MOV) containing a proprietary codec (ProRes). While widely supported today, given their proprietary natures they can easily become obsolete when the owner stops their support. Another example is a Kodak PhotoCD image file. This is an example of a simple digital object that is of a proprietary format that is no longer supported. If a user wants to view such an image, the content must be transcoded/migrated to JPEG, TIFF, or DNG. Yet other examples digital objects include a Claris Works document file and a MultiMate document file. These are examples of proprietary and obsolete formats. Both the format and the software are no longer supported by their respective owners. Content can only be rendered through emulation, if at all.

Digital obsolescence may occur due to varying reasons. For example, digital obsolescence may occur due to obsolete hardware (e.g., floppy disk drives no longer available) and obsolete software (e.g., MultiMate word processor from the 1980s no longer available to open MultiMate files).

Digital obsolescence negatively impacts many aspects of society, such as, law enforcement, business, science, culture, government, education, entertainment, and individuals. If data of a digital object cannot be accessed due to the obsolescence of format, codec, software, operating system, hardware, or other components required to read or render the digital object, the data is effectively lost. Lost data means lost assets. Lost assets means wasted financial and time investments, and in the case of law enforcement, lost evidence. Lost data may be irreplaceable.

Digital obsolescence negatively affects many types of computing devices. That is, digital obsolescence does not just affect traditional personal computers running standard operating systems and programs, but rather can affect several types of computing devices, from smartphones to aircraft avionics.

While the negative impact of digital obsolescence is wide reaching, current efforts relating to digital obsolescence are limited. For example, current efforts include format registries, design considerations, and archival formats.

Format registries are essentially a list of formats. The registries may list the format owner, development history, version history, signatures, and/or magic numbers. The registries may assign their own internal identifiers for each format. Format registries tend to focus on "singleton" formats (e.g., formats that stand alone rather than complex digital objects).

One example of a format registry is the PRONOM format registry. PRONOM is based at the National Archives in the United Kingdom. The PRONOM format registry maintains records for data file formats, software programs, and vendors. Formats and software programs are assigned PRONOM unique identifiers (PUIDs) using prefixes (e.g., format: fmt/353; software: x-sfw/86). Vendor information simply includes vendor names, addresses, and vendor website information.

PRONOM is structured, which helps with information retrieval. PRONOM may provide limited migration pathways with recommendations for migrating common formats such popular word processing document formats, image formats, and older PDF formats. Software program and vendor records in PRONOM may be stub files simply listing the software program or vendor name with the PUID. Format records in PRONOM may include hundreds of stub files that only give the name of the format with limited information related thereto. Only limited software dependencies are noted. Further, there are inconsistencies between PRONOM and at least one other registry. Accordingly, neither PRONOM nor the other registry may be fully accepted as authoritative.

Another example of a format registry is the Sustainability of Digital Formats format registry. The Sustainability of Digital Formats is based at the Library of Congress in the United States. The Sustainability of Digital Formats format registry is a website with narrative descriptions of formats. While not a database, the individual format entries can be downloaded as XML files for import into a database. The Sustainability of Digital Formats format registry does not include software dependencies, but does sometimes include versions and magic numbers. The registry has a limited number of formats, and conflicts with the PRONOM registry. The registry includes limited data and the hex offset data may not be correctly listed, if at all.

An example of a proposed format registry is the Digital Preservation Technical Registry. The Digital Preservation Technical Registry project is based at the National Library of New Zealand. The project envisions a data model including format, hardware, device, software, and carrier media information. The project envisions common reporting on file formats and preservation risk management across National and State Libraries Australasia (NSLA) libraries.

Digital obsolescence may be taken into account as a design consideration when software is developed. For example, the Building Resource Adaptive Software Systems (BRASS) project of the Defense Advanced Research Projects Agency (DARPA) in the United States, contemplates software obsolescence and its impact on accessing data. BRASS aims to develop software systems that will last at least 100 years. However, this approach will only be effective for software and systems developed in the future and not existing and legacy systems.

Digital obsolescence may be taken into account by archival formats. For example, the Society of Motion Picture and Television Engineers (SMPTE) developed an Archive eXchange Format (AXF), a container format that encapsulates information on a format and its original environment. However, AXF is only applied to video and digital cinema files. AXF has not yet reached wide adoption. Further, AXF itself is a complex digital object that should be monitored for obsolescence.

Conventional efforts relating to digital obsolescence present problems recognized by the present inventors as described more herein. Accordingly, digital obsolescence avoidance systems and methods are desirable.

BRIEF SUMMARY

It is an aspect of the present invention to provide an improved approach to managing digital obsolescence.

It is a further aspect of the present invention to provide digital obsolescence avoidance systems and methods.

According to one aspect of the present invention, a digital obsolescence avoidance system may be provided. A digital obsolescence avoidance system may include a validation system and an obsolescence vulnerabilities system. The validation system may be configured to receive metadata for the digital object and to determine a digital object kind for the received metadata. The obsolescence vulnerabilities system may be configured to determine one or more dependencies for the determined object kind, to determine an obsolescence vulnerability based on the determined one or more dependencies, and to provide output related to the determined obsolescence vulnerability.

According to another aspect of the present invention, a computer readable medium is provided that comprises instructions that when executed by at least one processor result in a digital obsolescence avoidance method. The digital obsolescence avoidance method may include receiving metadata for a digital object, determining a digital object kind for the received metadata, determining one or more dependencies for the determined digital object kind, determining an obsolescence vulnerability based on the determined one or more dependencies, and providing output related to the determined obsolescence vulnerability.

According to another aspect of the present invention, a computer readable medium is provided that comprises instructions that when executed by at least one processor result in a digital obsolescence avoidance method. The digital obsolescence avoidance method may include receiving a digital object and validating an object kind for the received digital object. The digital obsolescence avoidance method may further include determining one or more format values for the validated digital object, determining one or more software values for the validated digital object, determining one or more operating system (OS) values for the validated digital object, determining one or more hardware values for the validated digital object, and determining an obsolescence vulnerability for the validated object kind based on the one or more format values, the one or more software values, the one or more OS values, and the one or more hardware values. The foregoing and other aspects will become apparent from the following detailed description when considered in conjunction with the accompanying drawing figures.

DESCRIPTION

Figure 1:
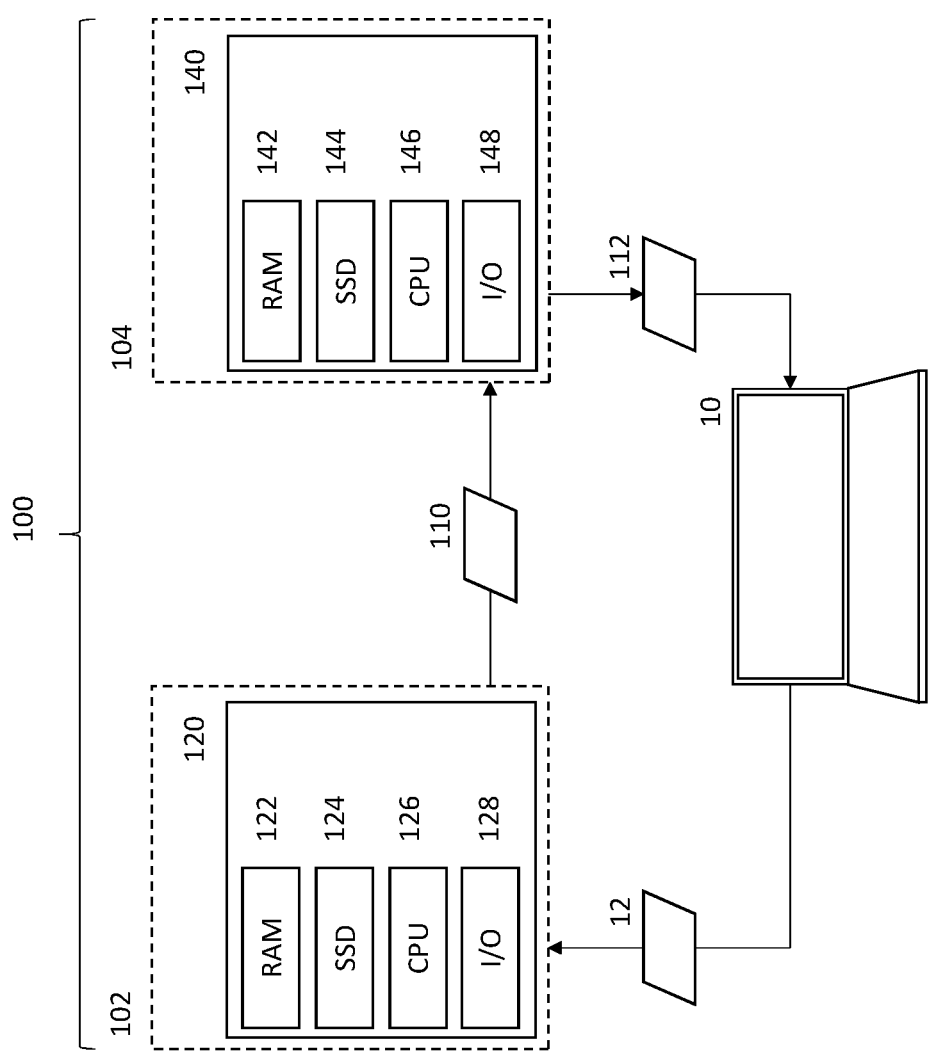
FIG. 1 is a schematic representation of a digital obsolescence avoidance system according to an exemplary embodiment of the present invention.
Figure 2:
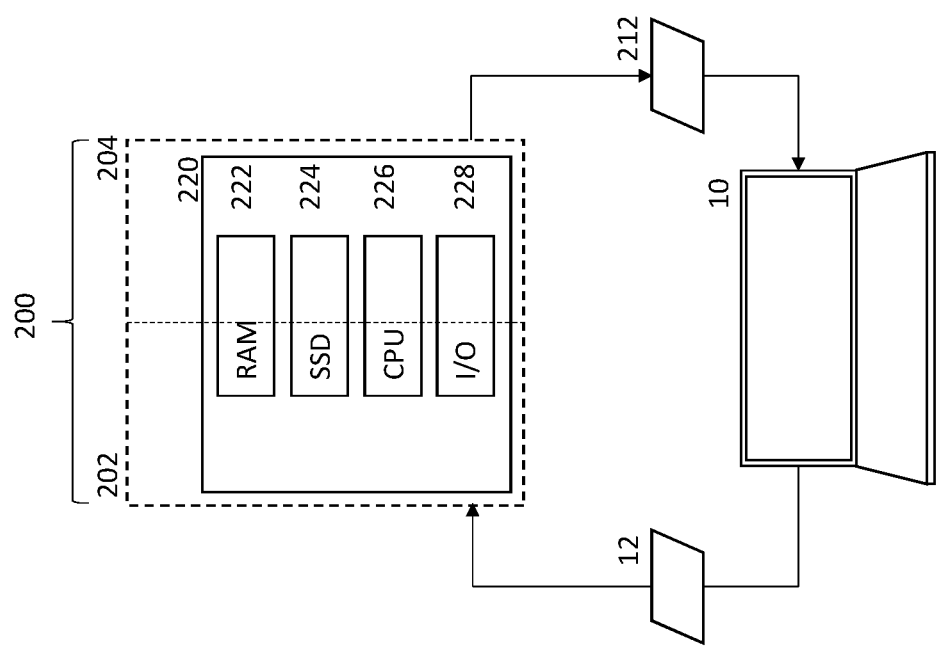
FIG. 2 is a schematic representation of a digital obsolescence avoidance system according to another exemplary embodiment of the present invention.

Reference will now be made in detail to embodiments of the present invention, examples of which are illustrated in the accompanying drawings, wherein like reference numerals refer to the like elements throughout. The embodiments are described below to explain the present invention by referring to the figures.

As used in the description of this application, the terms "a", "an" and "the" may refer to one or more than one of an element (e.g., item or act). For example, references to "a digital object" may refer to one or more than one digital object. Similarly, a particular quantity of an element may be described or shown while the actual quantity of the element may differ. For example, although a single processor may be shown or described, more than one processor may be provided. The terms "and" and "or" may be used in the conjunctive or disjunctive sense and will generally be understood to be equivalent to "and/or". Elements from an embodiment may be combined and substituted with elements of another. Elements described as separate elements may be combined into a single element. For example, although operating memory (e.g., Random Access Memory (RAM)) may be shown and described as being separate from long-term memory (e.g., Solid State Drive (SSD) memory, Hard Disk Drive (HDD) memory), it is conceivable that memory could be configured to serve as the operating memory and long-term memory. Similarly, an element described as single element may be split into two or more elements. No element used in the description of this application should be construed as critical or essential to the invention unless explicitly described as such. Further, when an element is described as "connected," "coupled," or otherwise linked to another element, it may be directly linked to the other element, or intervening elements may be present.

As noted above, conventional efforts relating to digital obsolescence present problems recognized by the present inventors. For example, file signatures and magic numbers may not be provided in all instances by a format registry. Further, a level of detail of digital object dependencies required to effectively monitor for digital obsolescence may not be offered by a format registry. The information provided by a format registry may not be complete and/or authoritative. Even if one day complete and authoritation provided by a format registry may not be meaningful and actionable by a recipient of such information.

An improved approach to managing digital obsolescence has been developed by the present inventors. In accordance with an exemplary embodiment of the present invention, a digital obsolescence avoidance system including a validation system and an obsolescence vulnerabilities system may be provided. The digital obsolescence avoidance system may determine an obsolescence vulnerability for a digital object based on one or more dependencies. The one or more dependencies may relate to one or more of a format, a codec, a software program, an operating system (OS), and a hardware device. The digital obsolescence avoidance system may provide actionable output based on the determined obsolescence vulnerability of the digital object.

FIG. 1 is a schematic representation of a digital obsolescence avoidance system 100 according to an exemplary embodiment. The digital obsolescence avoidance system 100 may include a validation system 102 and an obsolescence vulnerabilities system 104. The validation system 102 may include a computing device 120 including operating memory 122 such as Random-Access Memory (RAM), long-term memory 124 such as a Hard Disk Drive (HDD) or Solid-State Drive (SSD), one or more processors 126 such as a Central Processing Unit (CPU), and Input/Output (I/O) components 128 such as a port, network interface, keyboard, mouse, touchpad, touch screen, and/or monitor. Similarly, the obsolescence vulnerabilities system 104 may include a computing device 140 including operating memory 142, long-term memory 144, one or more processors 146, and Input/Output (I/O) components 148. One of ordinary skill in the art will appreciate that computing devices 120, 140 shown in FIG. 1 are simplified and for illustrative purposes, and that additional and/or alternative components may be present and that such alternative computing devices are considered to be within the scope of the claims.

One of ordinary skill in the art will appreciate that the digital obsolescence avoidance system 100 may be of varying architectures, all of which are considered to be within the scope of the claims. For example, in one embodiment, a digital obsolescence avoidance system 200 may include a validation system 202 and an obsolescence vulnerabilities system 204 co-located in one or more computing devices 220. In another embodiment, a digital obsolescence avoidance system may include a combined validation system and obsolescence vulnerabilities system co-located on a client computing device.

Figure 3:
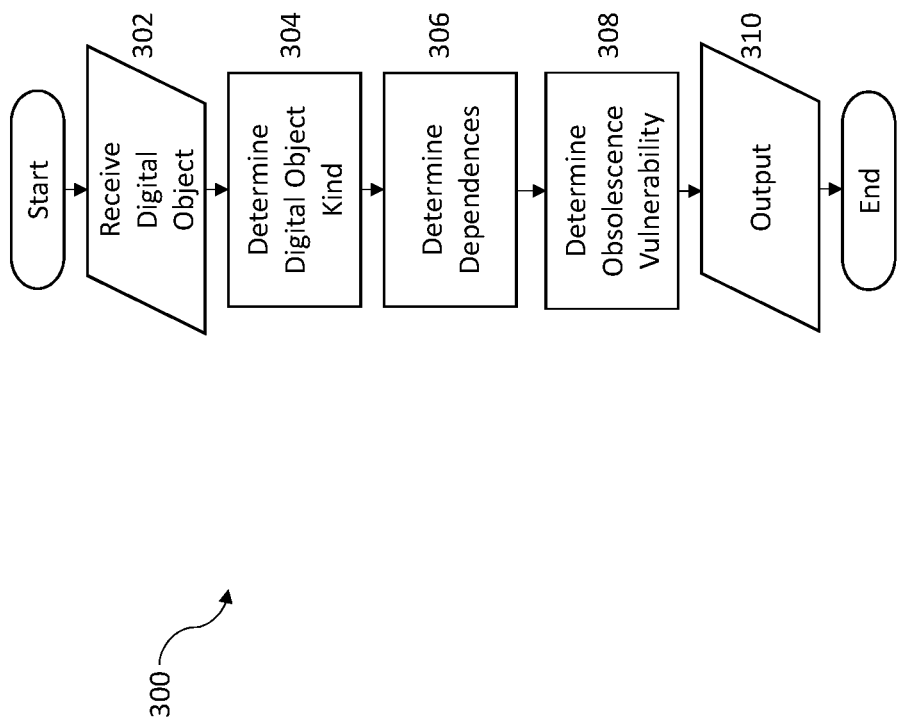
FIG. 3 is a flowchart of a digital obsolescence avoidance method according to an exemplary embodiment of the present invention.

The operation of the digital obsolescence avoidance system 100 is now discussed with reference to FIG. 3, which is a flowchart of a digital obsolescence avoidance method 300 according to an exemplary embodiment. As noted above, elements (including method operations) from one embodiment (e.g., 100, 300) may be combined and substituted with elements from another embodiment (e.g., 200, 400 (FIG. 4)).

In operation 302, the digital obsolescence avoidance system 100 may receive as input one or more digital objects (e.g., files or metadata thereof). In an embodiment, the validation system 102 may receive a digital object 12 from the client computing device 10. In the interest of brevity, metadata of a digital object and the digital object itself may be referred to herein as the digital object.

In operation 304, the digital obsolescence avoidance system 100 may determine a digital object kind for the received digital object. In an embodiment, the validation system 102 of the digital obsolescence avoidance system 100 may use multiple approaches to determine the digital object kind. For example, magic number matching, extension matching, and rules application may be used to determine the object kind. Accordingly, the digital obsolescence avoidance system 100 may be content-type agnostic.

In operation 306, the digital obsolescence avoidance system 100 may determine one or more digital object kind dependency values for the determined digital object kind. For example, in an embodiment, the obsolescence vulnerabilities system 104 of the digital obsolescence avoidance system 100 may receive a digital object kind 110 from the validation system 102 and determine one or more digital object kind dependency values for the received digital object kind 110. Digital object kind dependency values may include one or more values relating to one or more of format, codec, software, operating system (OS), and hardware dependencies. A digital object's renderability may include multiple layers of dependencies such as a codec, which may depend on a format, which may depend on software, which may depend on OS, which may depend on hardware or storage media. Each of these dependencies may be affected by one or more factors such as disclosure, deprecation, owner viability, owner type, and adoption.

Disclosure refers to whether an object (e.g., format, codec, software, OS, hardware) has open documentation. If documentation about the object is easily accessible such that the object can be copied into another product or easily shared, there is a greater likelihood that the object will not become obsolete. Conversely, if documentation about the object is closed and proprietary to the owner of the object, there is a greater likelihood that the object and any of its dependencies will become vulnerable for obsolescence.

Deprecation refers to intentional lack of support by the owner of an object. Once an owner no longer wishes to support an object, that object may be purposely deprecated by the owner of the object. If a format, codec, software, OS, or hardware component is not deprecated, there is a greater likelihood that the object will not become obsolete. Conversely, if an object is purposely deprecated, there is a greater likelihood that the object and any of its dependencies will become vulnerable for obsolescence.

Owner viability relates to the financial status of the entity responsible for the creation, manufacture, support, or maintenance of the object. The stronger the financial status of an owner, the less likely an object will become obsolete. The weaker the financial status of an owner, the more likely an object will become obsolete.

Owner type relates to the structure of an entity responsible for the creation, manufacture, support, or maintenance of the object. For example, an owner may be a standards body, a manufacturer consortium, a business, an open source community, a cultural heritage organization or consortium (academic institution, museum), or an individual. Objects from certain owner types (e.g., standards body, manufacturer consortium) are less likely to become obsolete, while objects from other owner types (e.g., an individual) are more likely to become obsolete.

Adoption may relate to a number of software programs that may support a digital object (i.e., a format and/or codec). A format or codec may be less likely to become obsolete if there is a wide variety of software programs that can render said format or codec. This may remain true even if the owner of the format or codec no longer supports said digital object. Conversely, an object is more likely to become obsolete if there are few software programs that can render that format or codec.

In operation 308, the digital obsolescence avoidance system 100 may determine a digital object kind obsolescence vulnerability based on the one or more digital object kind dependency values. For example, the obsolescence vulnerabilities system 104 of the digital obsolescence avoidance system 100 may calculate an obsolescence vulnerability score corresponding to the obsolescence vulnerability using the digital object kind dependency values relating to format, codec, software, operating system, and hardware dependencies.

Finally, in operation 310, digital obsolescence avoidance system 100 may provide an output 310 related to the determined obsolescence vulnerability. For example, in one embodiment, the obsolescence vulnerabilities system 104 may output 310 recommendations for mitigating or remedying the obsolescence vulnerability. In some embodiments, the obsolescence vulnerabilities system 104 may convert the received digital object that may be determined to be vulnerable to obsolescence into an updated digital object less vulnerable to obsolescence and output 310 the updated digital object. In some embodiments, the obsolescence vulnerabilities system may determine an emulator that may reduce vulnerability to obsolescence and output 310 the emulator. Thereafter, method 300 may restart or terminate.

Figure 4:
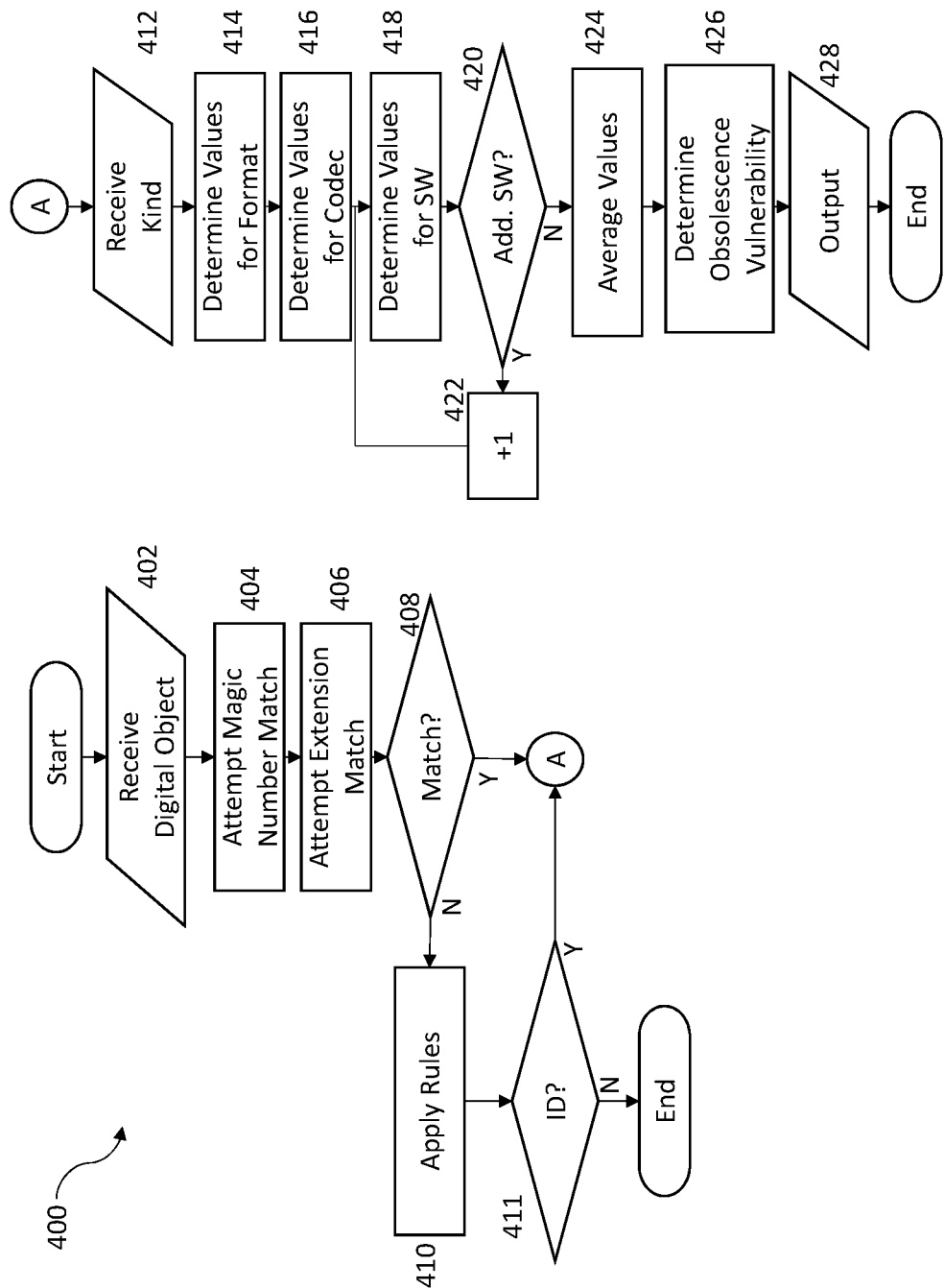
FIG. 4 is a flowchart of a digital obsolescence avoidance method according to another exemplary embodiment of the present invention.

The operation of the digital obsolescence avoidance system 200 is now discussed with reference to FIG. 4, which is a flowchart of a digital obsolescence avoidance method 400 according to an exemplary embodiment. As noted above, elements (including method operations) from one embodiment (e.g., 200, 400) may combined and substituted with elements from another embodiment (e.g., 100, 300).

In operation 402, the digital obsolescence avoidance system 200 may receive as input one or more digital objects (e.g., files or metadata thereof). In an embodiment, the validation system 202 may receive a digital object 12 (specifically, metadata of the digital object) from the client computing device 10. In the interest of brevity, metadata of a digital object and the digital object itself may be referred to herein as the digital object.

In operation 404, the validation system 202 may attempt to match a digital object's magic number. In an embodiment, the validation system 202 may access (e.g., from long-term memory 224 via operating memory 222) an object kind table (e.g., of a database) of digital object kinds comprising, for example, known magic numbers, extensions, and associated digital object kinds. By way of background, a magic number may be data of the object that identifies an object kind (e.g., file format or protocol). For example, a digital object may include a file header containing the magic number. The validation system 202 may compare a magic number (i.e., a file signature) of the digital object against the object kind table. Magic numbers may vary in length, but are typically at the beginning of the file header and are at least two digits. Accordingly, in an embodiment, the first two digits of a magic number may be compared against the object kind table. If a match of the first two digits is found (and the magic number of the digital object is longer than two digits), then the remainder of the magic number of the digital object may be compared against the found record in the object kind table. If the remainder of the magic number does not match the found record, then the validation system 102 may look for another match of the first two digits and then the remainder of the digital object magic number, and so on until a full match is found in the object kind table.

In operation 406, the validation system 202 may attempt to match a digital object's extension. In an embodiment, the validation system 202 may access the object kind table and compare an extension of the digital object against the object kind table.

In operation 408, a determination may be made whether a full match exists between the magic number and extension of the digital object and a record in the table of digital object kinds. If during operation 408 it is determined there is a full match, then the validation system 202 may return the matched digital object kind to the obsolescence vulnerabilities system 204 and the method 400 may proceed to operation 412, where the obsolescence vulnerabilities system 204 receives the digital object kind.

If during operation 408 it is determined that there is not a full match, then the validation system 202 may proceed to operation 410 where validation rules may be applied to the digital object to identify the digital object kind.

In operation 410, one or more tests may be applied to the digital object (i.e., rules application). For example, in an embodiment, partial matches of a magic number or an extension may be used to select a subset of rules to apply to a digital object in an attempt to identify the digital object. If there is no partial match, default or all rules may be applied to the digital object. Exemplary rules that may be applied include running a default battery of tests using file identification tools to identify at a minimum the broad class or type (video, audio, still, text, database, etc), and sending the information on the digital object to the Validation System for manual evaluation.

In operation 411, a determination may be made whether a digital object kind identification has been made for the digital object (or metadata thereof). If a digital object kind identification has been made for the digital object, then the validation system 202 may return the identified digital object kind to the obsolescence vulnerabilities system 204. The method 400 may proceed to operation 412, where the obsolescence vulnerabilities system 204 receives the digital object kind. If the digital object kind identification has not been made, then the method 400 may terminate.

In operation 412, the obsolescence vulnerabilities system 204 may receive as input one or more digital object kinds. For a digital object kind, the obsolescence vulnerabilities system 204 may in subsequent operations determine values relating to one or more of format, codec, software, operating system, and hardware. The digital object kind may be associated with one or more format IDs, codec IDs, software IDs, operating system IDs, and hardware IDs that may be used in determining the values relating to the format, codec, software, operating system (OS), and hardware.

In operation 414, the obsolescence vulnerabilities system 204 may determine values relating to a format. In an embodiment, the values relating to the format may include a format disclosure rank, a format deprecation rank, a format owner viability rank, a format owner type rank, and a format adoption rank.

The obsolescence vulnerabilities system 204 may access (e.g., from long-term memory 224 via operating memory 222) a format table (e.g., of a database) including the format ID, the format disclosure rank (e.g., a format disclosure rank value), the format deprecation rank, and an owner ID.

A format disclosure (i.e., documentation) rank may be a "1" corresponding to "open documentation, "2" corresponding to "moderately open documentation", or "5" corresponding to "closed (proprietary)". A format deprecation rank may be a "0" corresponding to "don't know", "1" corresponding to "no plans for deprecation", "3" corresponding to "over two years prior", "4" corresponding to "two years prior", "5" corresponding to "one-year prior", or "7" corresponding to "deprecated". One of ordinary skill in the art will appreciate that, like other aspects of the disclosure, the rank values and corresponding classifications discussed throughout this disclosure are non-limiting and for illustrative purposes only. Actual aspects, rank values and corresponding classifications may differ, and are considered to be within the scope of the claims.

The obsolescence vulnerabilities system 204 may access an owner table including the owner ID and associated values. For example, the owner table may include an owner viability rank and an owner type rank that may serve as the format owner viability rank and the format owner type rank, respectively.

An owner viability rank may be a "1" corresponding to "stable", "4" corresponding to "bankrupt", or "7" corresponding to "out of business". An owner type rank may be a "1" corresponding to "standards body", "2" corresponding to "manufacturer consortium", "3" corresponding to "company in business for 10 or more years", "4" corresponding to "company in business for less than 10 years", "5" corresponding to "open source community", "6" corresponding to "cultural, heritage, or educational organization or consortium", or "7" corresponding to "individual".

In an embodiment, the format adoption rank may be calculated based on the number of software programs supporting the format. For example, the obsolescence vulnerabilities system 204 may access a format-software table to determine how many software IDs are associated with a format (e.g., format ID). One of ordinary skill in the art will appreciate that, like other calculations and/or data values, the format adoption rank may take alternative forms. For example, the format adoption rank may be stored as a value based on an actual or estimated number of software programs supporting a format. For example, the format adoption rank may be a "1" corresponding to "101 or more software programs supporting the format (wide adoption)", "2" corresponding to "11 to 100 software programs supporting the format (supported)", "3" corresponding to "6-10 software programs supporting the format (monitor)", "4" corresponding to "1-5 software programs supporting the format (endangered)", or "5" corresponding to "0 software programs supporting the format (obsolete)".

In a simplified exemplary use case, the digital object kind may be a QuickTime video file and may include an associated format ID of "1". The obsolescence vulnerabilities system 204 may access the format table and use the format ID to retrieve a format disclosure rank of "3", a format deprecation rank of "1", and an owner ID of "1" (corresponding to Apple). The obsolescence vulnerabilities system 204 may access the owner table and use the owner ID to retrieve an owner viability rank of "1" and an owner type rank of "3" (to serve as the format owner viability rank and format owner type rank). The obsolescence vulnerabilities system 204 may access the format-software table and determine an adoption rank value of "2".

Operation 414 may return the format disclosure rank, format deprecation rank, format owner viability rank, format owner type rank, and adoption rank.

In operation 416, the obsolescence vulnerabilities system 204 may determine values relating to one or more codecs. In an embodiment, a format-codec table may be accessed to determine one or more codec IDs associated with a format (e.g., format ID). Values relating to the codec (e.g., a codec ID) may include a codec disclosure rank, a codec deprecation rank, a codec owner viability rank, a codec owner type rank, and a codec adoption rank. The obsolescence vulnerabilities system 204 may access a codec table including the codec ID, the codec disclosure rank, the codec deprecation rank, and an owner ID. The obsolescence vulnerabilities system 204 may access the owner table including the owner viability rank and owner type rank, which may serve as the codec owner viability rank and the codec owner type rank, respectively. The obsolescence vulnerabilities system 204 may access a codec-software table to determine how many software IDs are associated with a codec.

One of ordinary skill in the art will appreciate, that like other values, rank values may be averaged. For example, if there is more than one codec associated with a codec ID, the determined codec disclosure rank, codec deprecation rank, codec owner viability rank, codec owner type rank, and codec adoption rank may be an average of values the multiple codecs. Such averaging is discussed later with respect to values relating to one or more software programs.

In the simplified exemplary use case, the digital object kind may relate to a ProRess 422 SQ codec and may include an associated codec ID of "1". The obsolescence vulnerabilities system 204 may access the codec table and use the codec ID to retrieve a codec disclosure rank of "7", a codec deprecation rank of "1", and an owner ID of "1" (corresponding to Apple). The obsolescence vulnerabilities system 204 may access the owner table and use the owner ID to retrieve an owner viability rank of "1" (corresponding to "stable") and an owner type rank of "3" (corresponding to "company in business for 10 or more years"). The owner viability rank and owner type rank may serve as the codec owner viability rank and codec owner type rank.

Operation 416 may return the codec disclosure rank, codec deprecation rank, codec owner viability rank, codec owner type rank, and codec adoption rank.

In operations 418-424, the obsolescence vulnerabilities system 204 may determine values relating to one or more software programs. In an embodiment, a format-software table may be accessed to determine one or more software IDs associated with a format. Values relating to the software program may include a software disclosure rank, a software deprecation rank, a software owner viability rank, and a software owner type rank. The obsolescence vulnerabilities system 204 may access a software table including a software ID, a software disclosure rank, a software deprecation rank, and an owner ID. Referring to the owner table, the owner viability rank and owner type rank may serve as the software owner viability rank and the software owner type rank, respectively.

In an embodiment, software to software dependencies may also be taken into account. For example, the disclosure, deprecation, owner viability, and owner type of a supporting software program may be calculated as part of operations 418-424. In an embodiment, a software-software table may be accessed to determine one or more software to software dependencies that may exist.

As noted above, rank values may be averaged. For example, when more than one software program can render a format, averaging may be desirable. During operation 420, after accessing an nth set of software values for a nth matching software program (e.g., software ID), a determination may be made whether there is another matching software program. If during operation 420 it is determined that there is another software program that matches the format, the method may proceed to operation 422 and a counter that may represent the number of matching software programs may be incremented. The method 400 may return to operation 418, and the n+1 set of software values for the n+1 matching software program may be accessed. If during operation 420 it is determined that there is not another software program that matches the format, the method 400 may proceed to operation 424 and the nth set of software values may be averaged with previous matching sets (if more than one). In one embodiment, averaging may involve adding the values for each set of values and then dividing each total by the counter value. One of ordinary skill in the art will appreciate that alternative approaches to averaging may be employed and that such alternatives are considered to be within the scope of the claims.

Stated differently, when more than one software program can render a format, the obsolescence vulnerabilities system 204 may retrieve the values for the first software program that matches the format, then the second (and so on), and thereafter the values for each software program may be averaged (either after software value retrieval or later as part of an overall averaging by returning a total value and a count of each matching software program).

For each software program that can render a format, that software program may be dependent upon an operating system to run. Similarly, a software program and/or an operating system may be dependent upon certain hardware to run. Accordingly, in an embodiment, the obsolescence vulnerabilities system 204 may during operations 418-424 also access the values relating to one or more operating systems (OS) and the values relating to one or more hardware devices.

The values relating to an OS may be retrieved from an OS table including an OS ID, an OS disclosure rank, an OS deprecation rank, and an OS owner ID. Referring to the owner table, the owner viability rank and the owner type rank may serve as an OS owner viability rank and OS owner type rank, respectively. The values relating to a hardware device may be retrieved from a hardware table including a hardware disclosure rank, a hardware deprecation rank, and a hardware owner ID. Referring to the owner table, the owner viability rank and the owner type rank may serve as hardware owner viability rank and a hardware owner type rank, respectively.

As with averaging for each matching software program, OS values may be averaged for each matching OS. For example, when a software program is supported by more than one OS, the obsolescence vulnerabilities system 204 may retrieve the values for the first OS that supports the software program, then the second (and so on), and thereafter the values for each OS may be averaged.

One of ordinary skill in the art will appreciate that in some embodiments, rather than calculating every possible value, values may be calculated only for certain known dependency issues. For example, with respect to hardware, the number of hardware devices and combinations of hardware devices is virtually unlimited. Accordingly, in some embodiments, it may be assumed that software programs and/or OSs may function with hardware unless there is a known dependency. For example, AppleWorks may be dependent upon an Apple II computing device. Accordingly, if the software ID matches AppleWorks, the actual hardware dependency may be taken into account in calculating the values relating to one or more hardware devices.

Operations 418-424 may return (as applicable) the software disclosure rank, the software deprecation rank, the software owner viability rank, the software owner type rank, the OS disclosure rank, the OS deprecation rank, the OS owner viability rank, the OS owner type rank, the hardware disclosure rank, the hardware deprecation rank, the hardware owner viability rank, and the hardware owner type rank.

In a simplified exemplary use case, the obsolescence vulnerabilities system 204 may access, e.g., a format-software table and use the format ID to retrieve software IDs "1" and "7" corresponding to "Final Cut Pro X" and "Sony Vegas Pro", respectively. For each program, software disclosure (e.g., "1" for Final Cut Pro X and "7" for Sony Vegas Pro), depreciation ("1" and "0"), owner viability ("1" and "1"), and owner type ("3" and "3") may be accessed from software and owner tables. These values may be averaged. For each program, software to software dependencies may be taken into account. For each program, OS and hardware dependencies may similarly be taken into account.

In operation 426, an obsolescence vulnerability score may be calculated based on the values relating to format, codec, software, operating system, and hardware. A digital object kind obsolescence value may be correlated to recommendations for mitigating or remedying the obsolescence vulnerability. Exemplary obsolescence vulnerability scores and correlated recommendations may include "0" corresponding to "Not identified (e.g., further research should be done)", "1" corresponding to "Will not become obsolete", "2" corresponding to "Deprecation date known (more than a year out)", "3" corresponding to "Monitor ("assumed will become obsolete but date unknown", "4" corresponding to "Warning (deprecation within one year)", "5" corresponding to "Endangered (obsolete, but current software or system available to render or emulate)", "6" corresponding to "Obsolete (cannot be rendered or emulated, but could possibly be reintroduced)", and "7" corresponding to "Obsolete (cannot be rendered or emulated, cannot be reintroduced at a future date)". It is again stressed that the values and corresponding classifications discussed throughout this disclosure are non-limiting and for illustrative purposes only, and that actual values and corresponding classifications may differ, and are considered to be within the scope of the claims.

In operation 428, recommendations for mitigating or remedying the obsolescence vulnerability may be output to a user. In an embodiment, the obsolescence vulnerabilities system 204 may output the recommendations for mitigating or remedying the obsolescence vulnerability. In a simplified exemplary use case, an overall obsolescence vulnerability score and recommendation may be a "2.75" corresponding most closely to "Monitor". The method 400 may terminate.

Figure 5:
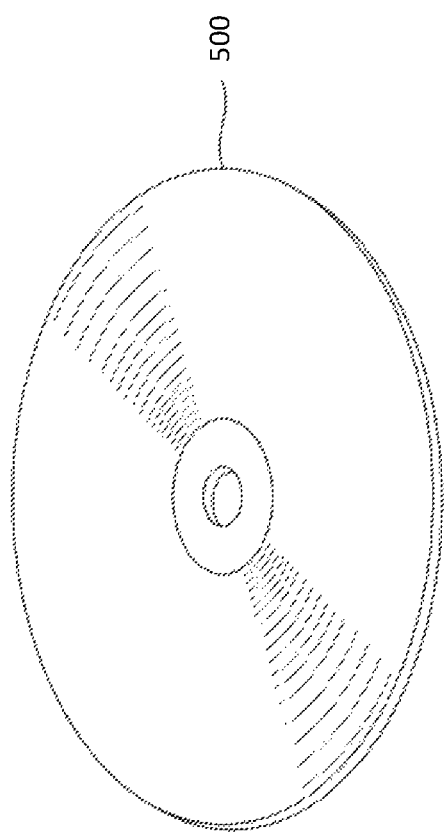
FIG. 5 is a schematic representation of a computer readable medium according to an exemplary embodiment of the present invention.

The methods or flowcharts provided in the present application may be implemented in a computer program, software or firmware tangibly embodied in a computer-readable storage medium, such as the computer-readable storage medium 500 of FIG. 5, for execution by a computer or one or more processors thereof.

Embodiments of the present invention provide an improved approach to managing digital obsolescence. Embodiments provide digital obsolescence avoidance systems and methods that provide for several benefits. For example, validation of a wider range of digital objects may be possible (relative to format registries) using magic number matching, extension matching, and rules application. As an additional benefit, greater detail of digital object dependencies may be tracked thereby enabling more effective monitoring for digital obsolescence. Yet another benefit is that comprehensive and authoritative digital object information may be provided for by the present embodiments. As an additional benefit, meaningful and actionable information regarding digital objects and their obsolescence vulnerabilities may be provided.

The foregoing description discloses only exemplary embodiments of the invention. Modifications of the above-disclosed embodiments of the present invention (beyond those modifications already mentioned) of which fall within the scope of the claims will be readily apparent to those of ordinary skill in the art. For example, although magic number matching is described with reference to a table, an alternative embodiment using data structures other than tables may be utilized. As another example, although dependencies relating to format, codec, software, OS, and hardware are discussed, additional dependencies such as File System can also be determined and calculated into a final obsolescence vulnerability.

Accordingly, although embodiments of the present invention have been shown and described, it would be appreciated by those skilled in the art that changes may be made in these embodiments without departing from the principles and spirit of the invention.

The invention claimed is:

1. A non-transitory computer readable medium comprising instructions that when executed by at least one processor result in a digital obsolescence avoidance method, the method comprising:
receiving metadata for a digital object;
determining a digital object kind for the received metadata;
determining one or more dependencies for the determined digital object kind including one or more format values, one or more software values, one or more OS values, and one or more hardware values;
determining an obsolescence vulnerability based on the determined one or more dependencies by calculating an obsolescence vulnerability score from the one or more format values, the one or more software values, the one or more OS values, and the one or more hardware values, wherein the obsolescence vulnerability score is correlated to the obsolescence vulnerability; and
providing output related to the determined obsolescence vulnerability, wherein the output is an updated digital object which is less vulnerable to obsolescence.

2. A non-transitory computer readable medium comprising instructions that when executed by at least one processor result in a digital obsolescence avoidance method, the method comprising:
receiving a digital object;
validating an object kind for the received digital object;
determining one or more format values for the validated digital object;
determining one or more software values for the validated digital object;
determining one or more operating system (OS) values for the validated digital object;
determining one or more hardware values for the validated digital object;
determining an obsolescence vulnerability for the validated object kind based on the one or more format values, the one or more software values, the one or more OS values, and the one or more hardware values; and
providing output related to the determined obsolescence vulnerability, wherein the output includes recommendations for mitigating or remedying any obsolescence vulnerabilities.

3. The non-transitory computer readable medium of claim 2, wherein the method further comprises:
determining one or more codec values for the validated object kind, wherein the determining of the obsolescence vulnerability is further based on the one or more codec values.

4. The non-transitory computer readable medium of claim 2, wherein one or more of the format values, the software values, the OS values, and the hardware values include:
a disclosure rank;
a deprecation rank;
an owner viability rank;
an owner type rank; and
an adoption rank.

5. The non-transitory computer readable medium of claim 4, wherein the disclosure rank indicates whether documentation is proprietary or open.

6. The non-transitory computer readable medium of claim 4, wherein the deprecation rank indicates deprecation by an owning entity.

7. The non-transitory computer readable medium of claim 4, wherein the owner viability rank relates to an economic status of an owner.

8. The non-transitory computer readable medium of claim 4, wherein the owner type rank indicates a structure of an owning entity.

9. The non-transitory computer readable medium of claim 4, wherein the adoption rank indicates a number of supporting objects.

10. The non-transitory computer readable medium of claim 1, wherein the method further comprises:
outputting recommendations corresponding to the obsolescence vulnerability.

11. The non-transitory computer readable medium of claim 1, wherein the method further comprises:
based on the obsolescence vulnerability, converting the digital object to a second digital object and outputting the second digital object; or
based on the obsolescence vulnerability, determining an emulator for the digital object and outputting the determined emulator.

12. The non-transitory computer readable medium of claim 1, wherein the determining of the one or more software values comprises the determining of the one or more OS values and the determining of the one or more hardware values.

* * * * *